US012706908B2

(12) United States Patent
Wolfe et al.

(10) Patent No.: US 12,706,908 B2
(45) Date of Patent: Aug. 11, 2026

(54) SYSTEMS AND METHODS FOR RECOGNIZING NEW DEVICES

(71) Applicant: Capital One Services, LLC, McLean, VA (US)

(72) Inventors: Mary K. Wolfe, Midlothian, VA (US); Suman Ojha, Glen Allen, VA (US); Noble Ozoka, Glen Allen, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 170 days.

(21) Appl. No.: 18/150,383

(22) Filed: Jan. 5, 2023

(65) Prior Publication Data

US 2024/0236091 A1 Jul. 11, 2024

(51) Int. Cl.

*H04L 9/40* (2022.01)
*H04L 41/16* (2022.01)
*H04L 41/22* (2022.01)

(52) U.S. Cl.

CPC .......... *H04L 63/0876* (2013.01); *H04L 41/16* (2013.01); *H04L 41/22* (2013.01); *H04L 63/20* (2013.01); *H04L 2463/082* (2013.01)

(58) Field of Classification Search

CPC ... H04L 63/0876; H04L 63/20; H04L 63/082; H04L 41/16; H04L 41/22
See application file for complete search history.

(56) References Cited

U.S. PATENT DOCUMENTS 6,963,908 B1 * 11/2005 Lynch ................. G06F 9/44505 709/221
7,941,128 B2 * 5/2011 Ueno ................. H04W 12/126 455/414.3

(Continued)

FOREIGN PATENT DOCUMENTS

AU 2012362419 A1 * 6/2014 ......... G06F 15/0208
WO 2022184441 A1 9/2022

OTHER PUBLICATIONS

International Search Report mailed Mar. 19, 2024 for Application No. PCT/US2024/010431.

(Continued)

*Primary Examiner* — Lynn D Feild
*Assistant Examiner* — Abdullah Almamun
(74) *Attorney, Agent, or Firm* — TROUTMAN PEPPER LOCKE LLP; Christopher J. Forstner; John A. Morrissett

(57) ABSTRACT

Disclosed embodiments may include a system for recognizing new devices. The system may receive data indicative of a user being associated with a new device, and may receive, via the new device, a request to perform an action. The system may generate, via a machine learning model (MLM), a trust score associated with the user and the new device. The system may determine whether the trust score exceeds a predetermined threshold. Responsive to determining the trust score does not exceed the predetermined threshold, the system may conduct fraud prevention action(s) with respect to the user and the new device. Responsive to determining the trust score exceeds the predetermined threshold, the system may cause the new device to display a notification. Responsive to receiving a response to the notification, the system may identify user setting(s) associated with a previous device, and enable the user setting(s) via the new device.

20 Claims, 4 Drawing Sheets

(56) References Cited

U.S. PATENT DOCUMENTS

| | | | | |
|---|---|---|---|---|
| 8,819,798 | B2 * | 8/2014 | Zises | H04L 67/75 726/7 |
| 10,013,548 | B2 * | 7/2018 | Oberheide | G06F 21/40 |
| 10,149,136 | B1 | 12/2018 | Sathya | |
| 11,172,350 | B1 * | 11/2021 | Chaugule | H04W 12/06 |
| 11,606,690 | B1 * | 3/2023 | Robinson | H04W 12/069 |
| 2003/0217042 | A1 * | 11/2003 | Thomas | G06Q 40/02 |
| 2009/0037207 | A1 * | 2/2009 | Farah | G06Q 10/103 705/301 |
| 2017/0201850 | A1 * | 7/2017 | Raleigh | H04W 4/50 |
| 2017/0214574 | A1 * | 7/2017 | Kanojia | H04B 17/318 |
| 2018/0332065 | A1 * | 11/2018 | Gupta | H04L 63/101 |
| 2019/0373471 | A1 * | 12/2019 | Li | H04L 9/3247 |
| 2020/0154236 | A1 * | 5/2020 | Carbune | H04W 4/38 |
| 2020/0252381 | A1 * | 8/2020 | Machani | H04L 9/3226 |
| 2020/0379946 | A1 * | 12/2020 | Coffman | G06F 3/0652 |
| 2021/0076204 | A1 * | 3/2021 | Goyal | H04L 67/306 |
| 2021/0383394 | A1 * | 12/2021 | Zarakas | G06F 18/214 |
| 2022/0021664 | A1 | 1/2022 | Sprague | |
| 2022/0155981 | A1 * | 5/2022 | Ciudad | G06F 3/0632 |
| 2022/0318394 | A1 | 10/2022 | Broome | |
| 2023/0093143 | A1 * | 3/2023 | Kaidi | G06F 21/31 726/6 |
| 2024/0098086 | A1 | 3/2024 | Iranitalab et al. | |
| 2024/0112184 | A1 * | 4/2024 | John | G06Q 30/06 |
| 2026/0094164 | A1 * | 4/2026 | Wheeler | G06Q 20/409 |

OTHER PUBLICATIONS

International Preliminary Report on Patentability in related International Patent Application No. PCT/US2024/010431, mailed Jul. 17, 2025 (11 pages).

* cited by examiner

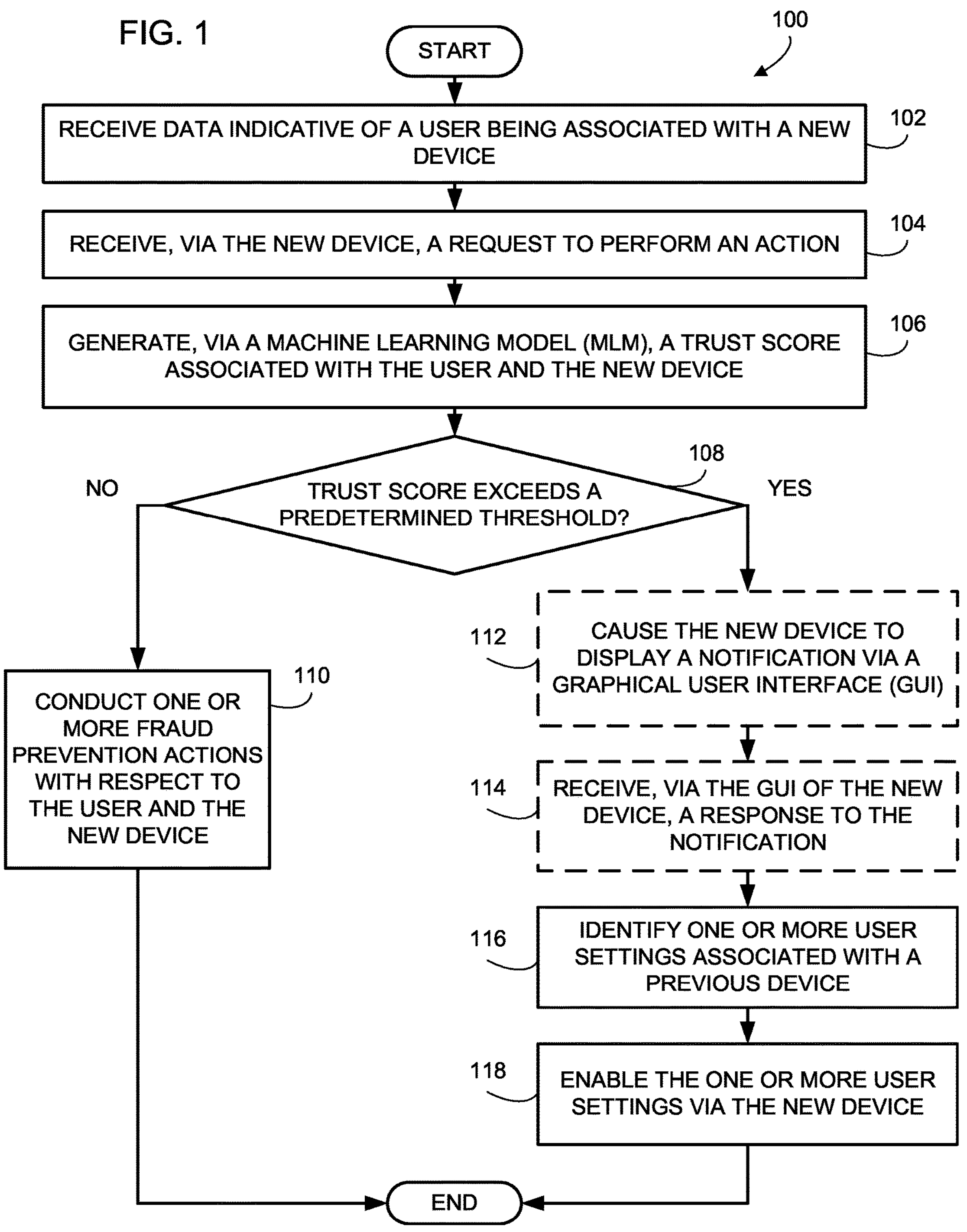
FIG. 1
100
START
RECEIVE DATA INDICATIVE OF A USER BEING ASSOCIATED WITH A NEW DEVICE
102
RECEIVE, VIA THE NEW DEVICE, A REQUEST TO PERFORM AN ACTION
104
GENERATE, VIA A MACHINE LEARNING MODEL (MLM), A TRUST SCORE ASSOCIATED WITH THE USER AND THE NEW DEVICE
106
TRUST SCORE EXCEEDS A PREDETERMINED THRESHOLD?
108
NO
YES
CONDUCT ONE OR MORE FRAUD PREVENTION ACTIONS WITH RESPECT TO THE USER AND THE NEW DEVICE
110
CAUSE THE NEW DEVICE TO DISPLAY A NOTIFICATION VIA A GRAPHICAL USER INTERFACE (GUI)
112
RECEIVE, VIA THE GUI OF THE NEW DEVICE, A RESPONSE TO THE NOTIFICATION
114
IDENTIFY ONE OR MORE USER SETTINGS ASSOCIATED WITH A PREVIOUS DEVICE
116
ENABLE THE ONE OR MORE USER SETTINGS VIA THE NEW DEVICE
118
END

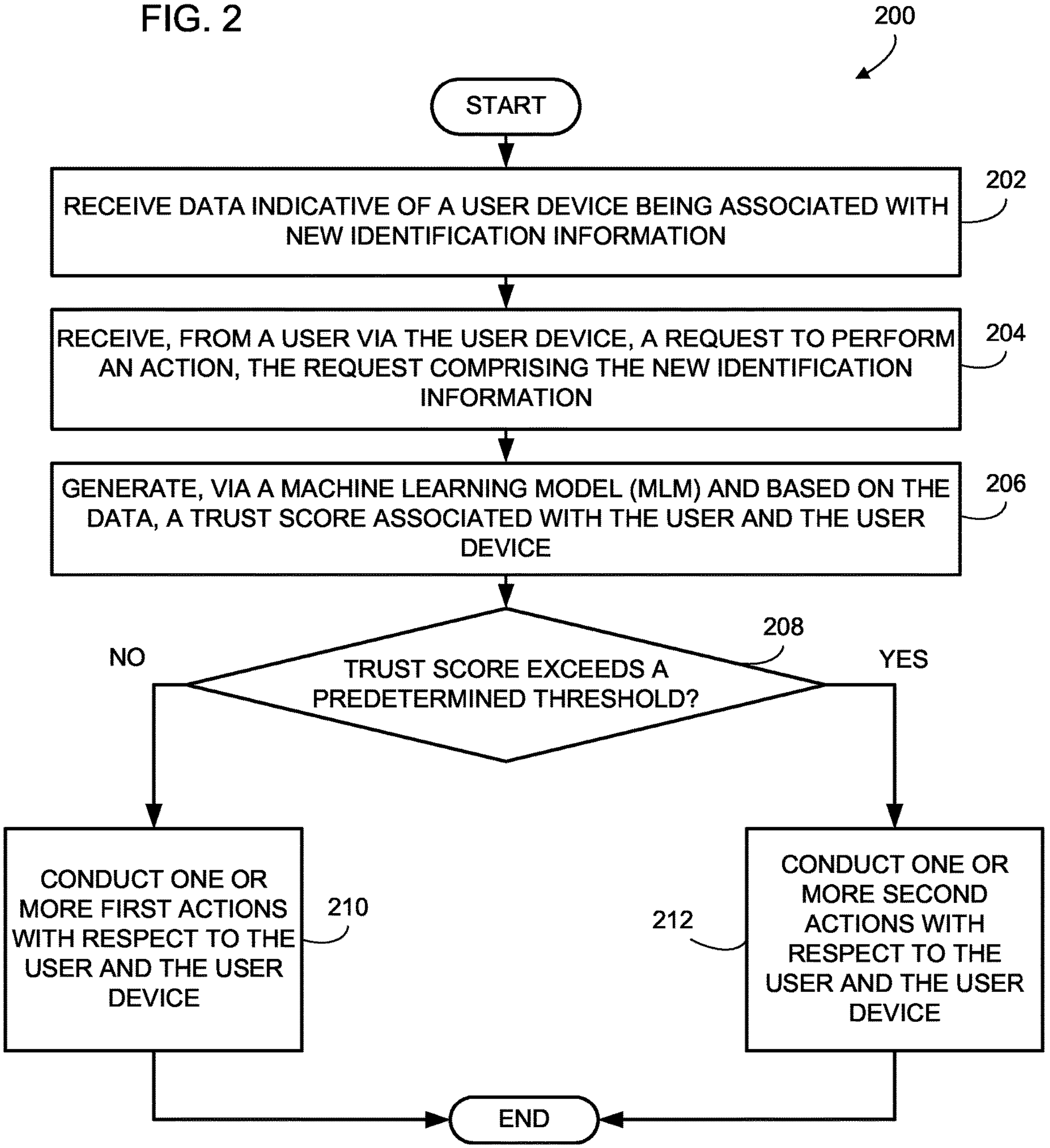
FIG. 2
200
START
RECEIVE DATA INDICATIVE OF A USER DEVICE BEING ASSOCIATED WITH NEW IDENTIFICATION INFORMATION
202
RECEIVE, FROM A USER VIA THE USER DEVICE, A REQUEST TO PERFORM AN ACTION, THE REQUEST COMPRISING THE NEW IDENTIFICATION INFORMATION
204
GENERATE, VIA A MACHINE LEARNING MODEL (MLM) AND BASED ON THE DATA, A TRUST SCORE ASSOCIATED WITH THE USER AND THE USER DEVICE
206
208
NO
TRUST SCORE EXCEEDS A PREDETERMINED THRESHOLD?
YES
CONDUCT ONE OR MORE FIRST ACTIONS WITH RESPECT TO THE USER AND THE USER DEVICE
210
212
CONDUCT ONE OR MORE SECOND ACTIONS WITH RESPECT TO THE USER AND THE USER DEVICE
END

SYSTEMS AND METHODS FOR RECOGNIZING NEW DEVICES

FIELD

The disclosed technology relates to systems and methods for recognizing new devices. Specifically, this disclosed technology relates to determining a trust score associated with a user and user device, and conducting one or more actions based on the determined trust score.

BACKGROUND

In a technology-driven society, individuals frequently obtain new devices to replace older models, versions, and/or types of devices. For example, individuals may update their mobile phones as new models, sizes, colors, etc., enter the marketplace. Switching to a new device typically requires individuals to set up the new device, including, for example, user settings, account settings, mobile applications, and the like.

Accordingly, there is a need for improved systems and methods for recognizing new devices. Embodiments of the present disclosure may be directed to this and other considerations.

SUMMARY

Disclosed embodiments may include a system for recognizing new devices. The system may include one or more processors, and memory in communication with the one or more processors and storing instructions that, when executed by the one or more processors, are configured to cause the system to recognize new devices. The system may receive data from a mobile device carrier, the data indicative of a user being associated with a new device. The system may receive, via the new device, a request to perform an action. The system may generate, via a machine learning model (MLM), a trust score associated with the user and the new device, wherein the trust score is based on the data and a previous trust score associated with the user and a previous device. The system may determine whether the trust score exceeds a predetermined threshold. Responsive to determining the trust score does not exceed the predetermined threshold, the system may conduct one or more fraud prevention actions with respect to the user and the new device. Responsive to determining the trust score exceeds the predetermined threshold, the system may cause the new device to display a notification via a graphical user interface (GUI), and receive, via the GUI of the new device, a response to the notification. Responsive to receiving the response, the system may identify one or more user settings associated with the previous device, and enable the one or more user settings via the new device.

Disclosed embodiments may include a system for recognizing new devices. The system may include one or more processors, and memory in communication with the one or more processors and storing instructions that, when executed by the one or more processors, are configured to cause the system to recognize new devices. The system may receive data indicative of a user being associated with a new device. The system may receive, via the new device, a request to perform an action. The system may generate, via an MLM and based on the data, a trust score associated with the user and the new device. The system may determine whether the trust score exceeds a predetermined threshold. Responsive to determining the trust score does not exceed the predetermined threshold, the system may conduct one or more fraud prevention actions with respect to the user and the new device. Responsive to determining the trust score exceeds the predetermined threshold, the system may identify one or more user settings associated with a previous device associated with the user, and enable the one or more user settings via the new device.

Disclosed embodiments may include a system for recognizing new devices. The system may include one or more processors, and memory in communication with the one or more processors and storing instructions that, when executed by the one or more processors, are configured to cause the system to recognize new devices. The system may receive data indicative of a user device being associated with new identification information. The system may receive, from a user via the user device, a request to perform an action, the request comprising the new identification information. The system may generate, via an MLM and based on the data, a trust score associated with the user and the user device. The system may determine whether the trust score exceeds a predetermined threshold. Responsive to determining the trust score does not exceed the predetermined threshold, the system may conduct one or more first actions with respect to the user and the user device. Responsive to determining the trust score exceeds the predetermined threshold, the system may conduct one or more second actions with respect to the user and the user device.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings:

FIG. 1 is a flow diagram illustrating an exemplary method for recognizing new devices in accordance with certain embodiments of the disclosed technology.

FIG. 2 is a flow diagram illustrating an exemplary method for recognizing new devices in accordance with certain embodiments of the disclosed technology.

DETAILED DESCRIPTION

Figure 3:
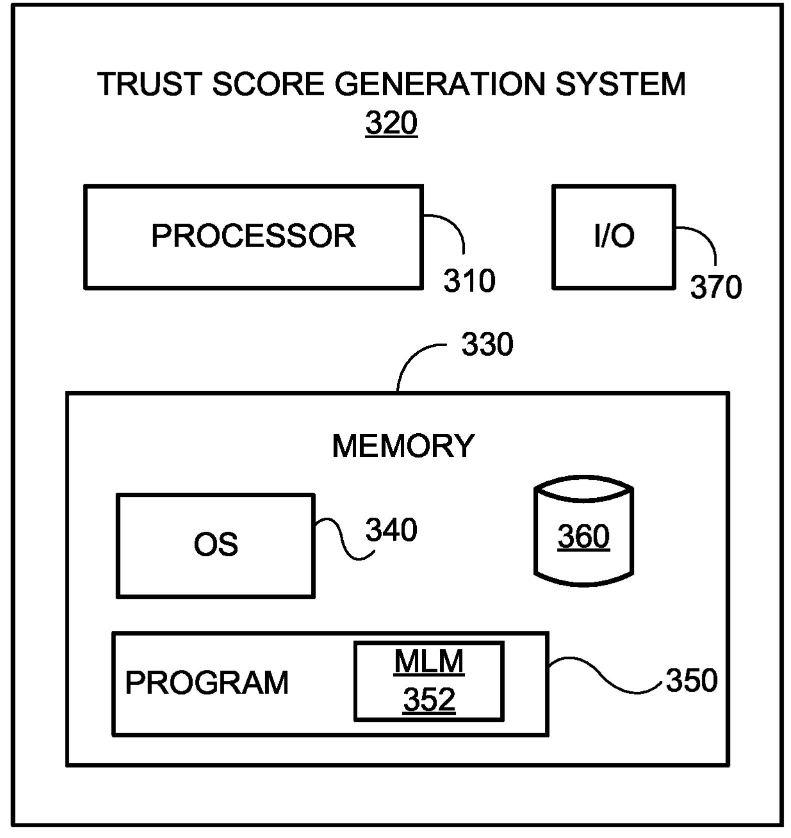
FIG. 3 is a block diagram of an example trust score generation system used to recognize new devices, according to an example implementation of the disclosed technology.

Individuals may frequently find themselves updating various features and settings (e.g., user settings, account settings, authentication settings, etc.) when switching over to new devices. This updating can not only be cumbersome and/or technically challenging to individuals, but may also subject organizations and businesses associated with these new devices (e.g., employers who provide mobile devices to their employees) to potential fraud, for example, if unauthorized users attempt to conduct transactions via the new devices.

Accordingly, examples of the present disclosure may provide for receiving data indicative of a user being associated with a new device, determining a trust score associated with the user and new device, and conducting certain actions based on the determined score (e.g., fraud prevention actions, or automatic transferring of previous user settings onto the new device).

Disclosed embodiments may employ machine learning models (MLMs), among other computerized techniques, to determine a trust score associated with a user and a new device. Machine learning models are a unique computer technology that involves training models to complete tasks and make decisions. These techniques may help to improve database and network operations. For example, the systems and methods described herein may utilize, in some instances, MLMs, which are necessarily rooted in computers and technology, to evaluate data corresponding to a user to determine the likelihood that the user is associated with a new device. This, in some examples, may involve using user-specific input data and an MLM, applied to determine a trust score for a user-device pair. Using an MLM and a computer system configured in this way may allow the system to either conduct fraud prevention actions, or automatically enable certain settings on the new device based on the trustworthiness of the user-device pair.

This may provide an advantage and improvement over prior technologies that require setting up devices on an individual basis, which can be cumbersome to individuals and cause significant technical challenges in ensuring smooth transitions to new properly functioning devices. The present disclosure solves this problem by determining a trust score associated with each user and new device, and conducting certain actions based on the determined trust score. Furthermore, examples of the present disclosure may also improve the speed with which computers can determine user-device pair trust scores. Overall, the systems and methods disclosed have significant practical applications in the device customization and fraud prevention fields because of the noteworthy improvements of the determination of user-device trust scores to dictate a system's resulting actions, which are important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a flow diagram illustrating an exemplary method 100 for recognizing new devices, in accordance with certain embodiments of the disclosed technology. The steps of method 100 may be performed by one or more components of the system 400 (e.g., trust score generation system 320 or web server 410 of device recognition system 408, or user device 402), as described in more detail with respect to FIGS. 3 and 4. While certain blocks may be identified as being optional, certain embodiments may omit blocks even if they are not necessarily identified as being optional.

In block 102, the trust score generation system 320 may receive data from a mobile device carrier, the data indicative of a user being associated with a new device. For example, the system may be configured to receive identification information associated with the new device (e.g., a model number, serial number, phone number, device identification, mobile equipment identifier, etc.), a date and/or time the user purchased or was provided with the new device, and/or any other information that may help to alert the system that the user switched from a previous device to a new device. In some embodiments, the mobile device carrier may be associated with the new device and/or the previous device.

In block 104, the trust score generation system 320 may receive, via the new device, a request to perform an action. In some embodiments, the action may include, for example, accessing an account, joining a computer network, participating in a joint user session, conducting a transaction, and the like. In some embodiments, the system may receive the request via, for example, a GUI of a mobile application or program running on the new device.

In block 106, the trust score generation system 320 may generate, via an MLM, a trust score associated with the user and the new device. In some embodiments, the trust score may be based on the data received from the mobile device carrier (block 102), and/or a previous trust score associated with the user and a previous device. In some embodiments, the trust score may indicate a likelihood that the user is associated with the new device (e.g., owns and/or is an authorized user of the new device).

In block 108, the trust score generation system 320 may determine whether the trust score exceeds a predetermined threshold. In some embodiments, the predetermined threshold may be a default or pre-selected threshold selected by an organization that owns and/or operates the system. For example, the predetermined threshold may be a numerical value or percentage within a predefined range, for example, a range of 0-10, or 0-100%. The predetermined threshold may indicate the organization's tolerance for potential fraud. For example, the predetermined threshold may be selected to be 75% on a scale of 0-100%, meaning if the system determines there is less than and/or equal to a 75% chance that the user is not associated with the new device, the system may be on alert for potential fraud, as further discussed below. Alternatively, if the system determines there is greater than and/or equal to a 75% chance that the user is associated with the new device, the system may associate this user and new device as a trusted user-device pair.

In block 110, responsive to determining the trust score does not exceed the predetermined threshold, the trust score generation system 320 may conduct one or more fraud prevention actions with respect to the user and the new device. In some embodiments, the fraud prevention action(s) may include transmitting a notification to a secondary device associated with the user (e.g., a pop-up alert, email, text message, etc.), and/or requesting the user conduct multi-factor authentication.

In optional block 112, responsive to determining the trust score exceeds the predetermined threshold, the trust score generation system 320 may cause the new device to display a notification via a GUI. For example, the notification may request the user indicate whether he/she desires to transfer any settings from a previous device to the new device. In some embodiments, the settings may include user settings or preferences, account settings, specific mobile application settings or selections, security settings, authentication settings, and the like. In some embodiments, the settings may be associated with a specific mobile application installed on the new device. In some embodiments, the notification may include one or more editable fields (e.g., click buttons, drop-down menus, toggle switches, etc.) such that the user may indicate which, if any, user settings, account settings, mobile application settings, etc., the user wishes to have transferred from a previous device to the new device.

In some embodiments, the trust score generation system 320 may be configured to conduct one or more actions with respect to the user's previous device. For example, the system may be configured to clean up and/or organize certain data associated with the previous device, and/or manage any security, authentication, or other settings associated with the previous device. In some embodiments where a notification may be sent to the user via a GUI, as discussed above, the notification may request the user indicate whether he/she desires to make any changes to a previous device, such as unenrolling from a particular application, deactivating any device-specific authentication methods and/or linking, and the like.

In optional block 114, the trust score generation system 320 may receive, via the GUI of the new device, a response to the notification. For example, the user may have provided responses to one or more of the editable fields, as discussed above, such that the system understands which settings, if any, the user wishes to have transferred from a previous device to the new device, and/or which settings or data associated with the previous device should be managed and/or modified.

In block 116, responsive to receiving the response, the trust score generation system 320 may identify one or more user settings associated with the previous device. As discussed above, the user settings may include user settings or preferences, account settings, mobile application settings or selections, security settings, authentication settings, etc. In some embodiments, the system may recognize user settings associated with the previous device when both the previous device and new device are connected to the same network (e.g., network 406), and/or if the system owns and/or operates any of the specific user settings or mobile applications associated with the previous device.

In block 118, the trust score generation system 320 may enable the one or more user settings via the new device. For example, the system may be configured to automatically apply the user settings to the new device. In some embodiments, as discussed above, the system may be configured to manage and/or modify user settings on the previous device.

FIG. 2 is a flow diagram illustrating an exemplary method 200 for recognizing new devices, in accordance with certain embodiments of the disclosed technology. The steps of method 200 may be performed by one or more components of the system 400 (e.g., trust score generation system 320 or web server 410 of device recognition system 408, or user device 402), as described in more detail with respect to FIGS. 3 and 4.

Method 200 of FIG. 2 may be the same as or similar to method 100 of FIG. 1, except that method 200 may provide a method by which a user may not have switched physical devices, but instead may have changed certain identification information associated with a device. The respective descriptions of blocks 204, 206, 208, and 210 of method 200 may be the same as or similar to the respective descriptions of blocks 104, 106, 108, and 110 of method 100, and as such, are not repeated herein for brevity.

In block 202, the trust score generation system 320 may receive data indicative of a user device being associated with new identification information. In some embodiments, the new identification information may include a phone number, an account number, a service carrier, and the like. In some embodiments, the system may receive the data from a mobile device carrier associated with the user device.

In block 212, the trust score generation system 320 may conduct one or more second actions with respect to the user and the user device. In some embodiments, the second action(s) may include identifying one or more user settings previously associated with the user device, and/or enabling the one or more user settings via the user device, as discussed above with respect to method 100.

Figure 4:
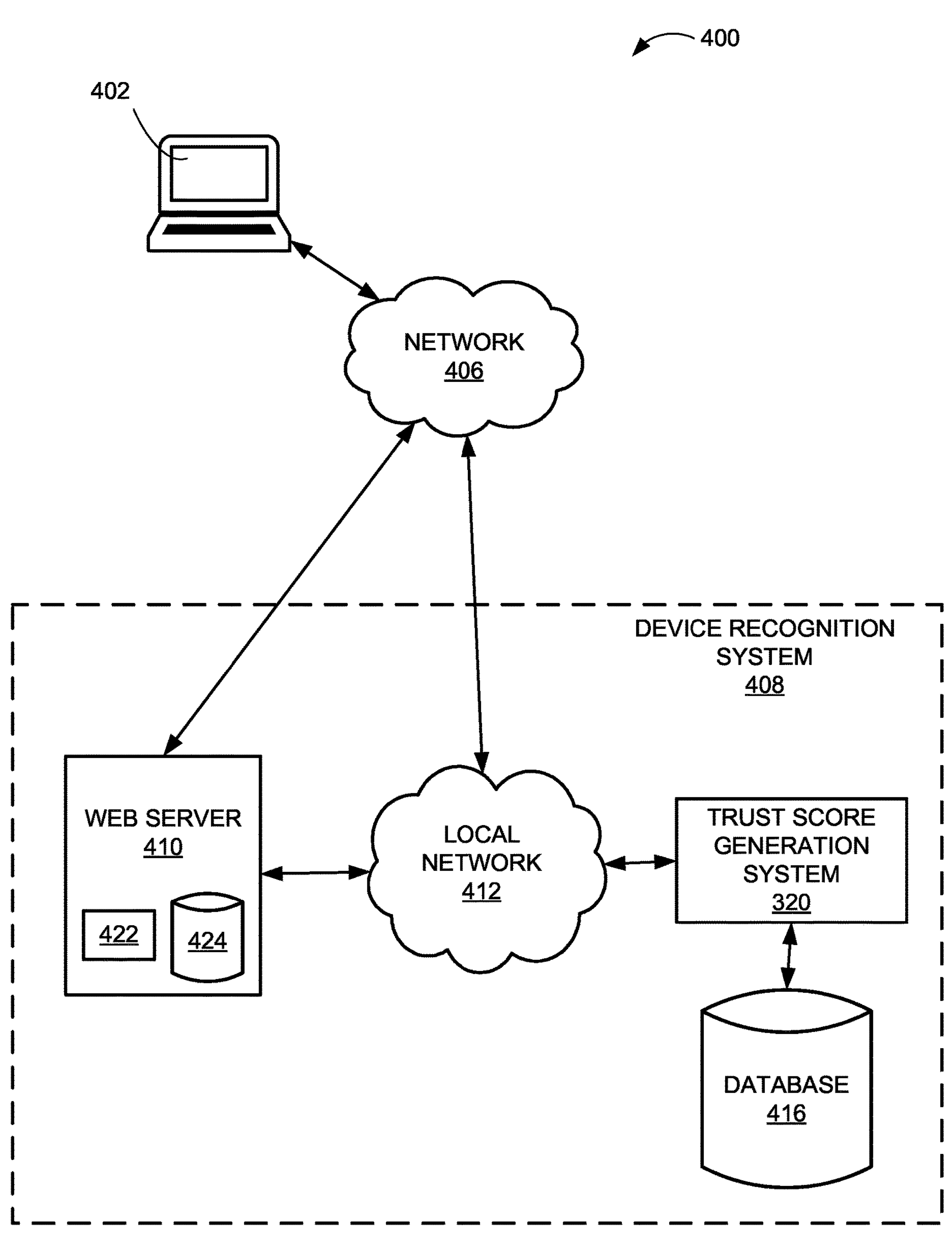
FIG. 4 is a block diagram of an example system that may be used to recognize new devices, according to an example implementation of the disclosed technology.

FIG. 3 is a block diagram of an example trust score generation system 320 used to recognize new devices, according to an example implementation of the disclosed technology. According to some embodiments, the user device 402 and web server 410, as depicted in FIG. 4 and described below, may have a similar structure and components that are similar to those described with respect to trust score generation system 320 shown in FIG. 3. As shown, the trust score generation system 320 may include a processor 310, an input/output (I/O) device 370, a memory 330 containing an operating system (OS) 340 and a program 350. In some embodiments, program 350 may include an MLM 352 that may be trained, for example, to determine a trust score associated with a user and a new user device. In certain implementations, MLM 352 may issue commands in response to processing an event, in accordance with a model that may be continuously or intermittently updated. Moreover, processor 310 may execute one or more programs (such as via a rules-based platform or the trained MLM 352), that, when executed, perform functions related to disclosed embodiments.

In certain example implementations, the trust score generation system 320 may be a single server or may be configured as a distributed computer system including multiple servers or computers that interoperate to perform one or more of the processes and functionalities associated with the disclosed embodiments. In some embodiments trust score generation system 320 may be one or more servers from a serverless or scaling server system. In some embodiments, the trust score generation system 320 may further include a peripheral interface, a transceiver, a mobile network interface in communication with the processor 310, a bus configured to facilitate communication between the various components of the trust score generation system 320, and a power source configured to power one or more components of the trust score generation system 320.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), NFC, Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 310 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 310 may be a single core processor that is configured with virtual processing technologies. In certain embodiments, the processor 310 may use logical processors to simultaneously execute and control multiple processes. The processor 310 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the trust score generation system 320 may include one or more storage devices configured to store information used by the processor 310 (or other components) to perform certain functions related to the disclosed embodiments. In one example, the trust score generation system 320 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The trust score generation system 320 may include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the trust score generation system 320 may include the memory 330 that may include one or more programs 350 to perform one or more functions of the disclosed embodiments. For example, in some embodiments, the trust score generation system 320 may additionally manage dialogue and/or other interactions with the customer via a program 350.

The processor 310 may execute one or more programs 350 located remotely from the trust score generation system 320. For example, the trust score generation system 320 may access one or more remote programs that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include a database 360 for storing related data to enable the trust score generation system 320 to perform one or more of the processes and functionalities associated with the disclosed embodiments.

The database 360 may include stored data relating to status data (e.g., average session duration data, location data, idle time between sessions, and/or average idle time between sessions) and historical status data. According to some embodiments, the functions provided by the database 360 may also be provided by a database that is external to the trust score generation system 320, such as the database 416 as shown in FIG. 4.

The trust score generation system 320 may also be communicatively connected to one or more memory devices (e.g., databases) locally or through a network. The remote memory devices may be configured to store information and may be accessed and/or managed by the trust score generation system 320. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The trust score generation system 320 may also include one or more I/O devices 370 that may comprise one or more interfaces for receiving signals or input from devices and providing signals or output to one or more devices that allow data to be received and/or transmitted by the trust score generation system 320. For example, the trust score generation system 320 may include interface components, which may provide interfaces to one or more input devices, such as one or more keyboards, mouse devices, touch screens, track pads, trackballs, scroll wheels, digital cameras, microphones, sensors, and the like, that enable the trust score generation system 320 to receive data from a user (such as, for example, via the user device 402).

In examples of the disclosed technology, the trust score generation system 320 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The trust score generation system 320 may contain programs that train, implement, store, receive, retrieve, and/or transmit one or more MLMs. Machine learning models may include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model, logistic regression, XGBoost, and/or another machine learning model. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The trust score generation system 320 may be configured to adjust model parameters during training. Model parameters may include weights, coefficients, offsets, or the like. Training may be supervised or unsupervised.

The trust score generation system 320 may be configured to train machine learning models by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The trust score generation system 320 may be configured to optimize statistical models using known optimization techniques.

Furthermore, the trust score generation system 320 may include programs configured to retrieve, store, and/or analyze properties of data models and datasets. For example, trust score generation system 320 may include or be configured to implement one or more data-profiling models. A data-profiling model may include machine learning models and statistical models to determine the data schema and/or a statistical profile of a dataset (e.g., to profile a dataset), consistent with disclosed embodiments. A data-profiling model may include an RNN model, a CNN model, or other machine-learning model.

The trust score generation system 320 may include algorithms to determine a data type, key-value pairs, row-column data structure, statistical distributions of information such as keys or values, or other property of a data schema may be configured to return a statistical profile of a dataset (e.g., using a data-profiling model). The trust score generation system 320 may be configured to implement univariate and multivariate statistical methods. The trust score generation system 320 may include a regression model, a Bayesian model, a statistical model, a linear discriminant analysis model, or other classification model configured to determine one or more descriptive metrics of a dataset. For example, trust score generation system 320 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

The trust score generation system 320 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, trust score generation system 320 may be configured to generate a similarity metric representing a measure of similarity between data in a dataset. A similarity metric may be based on a correlation, covariance matrix, a variance, a frequency of overlapping values, or other measure of statistical similarity.

The trust score generation system 320 may be configured to generate a similarity metric based on data model output, including data model output representing a property of the data model. For example, trust score generation system 320 may be configured to generate a similarity metric based on activation function values, embedding layer structure and/or outputs, convolution results, entropy, loss functions, model training data, or other data model output). For example, a synthetic data model may produce first data model output based on a first dataset and second data model output based on a second dataset, and a similarity metric may be based on a measure of similarity between the first data model output and the second data model output. In some embodiments, the similarity metric may be based on a correlation, a covariance, a mean, a regression result, or other similarity between a first data model output and a second data model output. Data model output may include any data model output as described herein or any other data model output (e.g., activation function values, entropy, loss functions, model training data, or other data model output). In some embodiments, the similarity metric may be based on data model output from a subset of model layers. For example, the similarity metric may be based on data model output from a model layer after model input layers or after model embedding layers. As another example, the similarity metric may be based on data model output from the last layer or layers of a model.

The trust score generation system 320 may be configured to classify a dataset. Classifying a dataset may include determining whether a dataset is related to another dataset. Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may indicate a similarity between datasets and/or a hierarchical relationship (e.g., a data lineage, a parent-child relationship). In some embodiments, classifying a dataset may include generating graphical data, such as anode diagram, a tree diagram, or a vector diagram of datasets. Classifying a dataset may include estimating a likelihood that a dataset relates to another dataset, the likelihood being based on the similarity metric.

The trust score generation system 320 may include one or more data classification models to classify datasets based on the data schema, statistical profile, and/or edges. A data classification model may include a convolutional neural network, a random forest model, a recurrent neural network model, a support vector machine model, or another machine learning model. A data classification model may be configured to classify data elements as actual data, synthetic data, related data, or any other data category. In some embodiments, trust score generation system 320 is configured to generate and/or train a classification model to classify a dataset, consistent with disclosed embodiments.

The trust score generation system 320 may also contain one or more prediction models. Prediction models may include statistical algorithms that are used to determine the probability of an outcome, given a set amount of input data. For example, prediction models may include regression models that estimate the relationships among input and output variables. Prediction models may also sort elements of a dataset using one or more classifiers to determine the probability of a specific outcome. Prediction models may be parametric, non-parametric, and/or semi-parametric models.

In some examples, prediction models may cluster points of data in functional groups such as "random forests." Random Forests may comprise combinations of decision tree predictors. (Decision trees may comprise a data structure mapping observations about something, in the "branch" of the tree, to conclusions about that thing's target value, in the "leaves" of the tree.) Each tree may depend on the values of a random vector sampled independently and with the same distribution for all trees in the forest. Prediction models may also include artificial neural networks. Artificial neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via one or more weighted connections. Prediction models may additionally or alternatively include classification and regression trees, or other types of models known to those skilled in the art. To generate prediction models, the asset detection system may analyze information applying machine-learning methods.

While the trust score generation system 320 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the trust score generation system 320 may include a greater or lesser number of components than those illustrated.

FIG. 4 is a block diagram of an example system that may be used to view and interact with device recognition system 408, according to an example implementation of the disclosed technology. The components and arrangements shown in FIG. 4 are not intended to limit the disclosed embodiments as the components used to implement the disclosed processes and features may vary. As shown, device recognition system 408 may interact with a user device 402 via a network 406. In certain example implementations, the device recognition system 408 may include a local network 412, a trust score generation system 320, a web server 410, and a database 416.

In some embodiments, a respective user may operate the user device 402. The user device 402 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 406 and ultimately communicating with one or more components of the device recognition system 408. In some embodiments, the user device 402 may include or incorporate electronic communication devices for hearing or vision impaired users.

Users may include individuals such as, for example, subscribers, clients, prospective clients, or customers of an entity associated with an organization, such as individuals who have obtained, will obtain, or may obtain a product, service, or consultation from or conduct a transaction in relation to an entity associated with the device recognition system 408. According to some embodiments, the user device 402 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The trust score generation system 320 may include programs (scripts, functions, algorithms) to configure data for visualizations and provide visualizations of datasets and data models on the user device 402. This may include programs to generate graphs and display graphs. The trust score generation system 320 may include programs to generate histograms, scatter plots, time series, or the like on the user device 402. The trust score generation system 320 may also be configured to display properties of data models and data model training results including, for example, architecture, loss functions, cross entropy, activation function values, embedding layer structure and/or outputs, convolution results, node outputs, or the like on the user device 402.

The network 406 may be of any suitable type, including individual connections via the internet such as cellular or WiFi networks. In some embodiments, the network 406 may connect terminals, services, and mobile devices using direct connections such as RFID, NFC, Bluetooth™, BLE, WiFi™, ZigBee™, ABC protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 406 may include any type of computer networking arrangement used to exchange data. For example, the network 406 may be the Internet, a private data network, virtual private network (VPN) using a public network, and/or other suitable connection(s) that enable(s) components in the system 400 environment to send and receive information between the components of the system 400. The network 406 may also include a PSTN and/or a wireless network.

The device recognition system 408 may be associated with and optionally controlled by one or more entities such as a business, corporation, individual, partnership, or any other entity that provides one or more of goods, services, and consultations to individuals such as customers. In some embodiments, the device recognition system 408 may be controlled by a third party on behalf of another business, corporation, individual, partnership, etc. The device recognition system 408 may include one or more servers and computer systems for performing one or more functions associated with products and/or services that the organization provides.

Web server 410 may include a computer system configured to generate and provide one or more websites accessible to customers, as well as any other individuals involved in accessing device recognition system 408's normal operations. Web server 410 may include a computer system configured to receive communications from user device 402 via for example, a mobile application, a chat program, an instant messaging program, a voice-to-text program, an SMS message, email, or any other type or format of written or electronic communication. Web server 410 may have one or more processors 422 and one or more web server databases 424, which may be any suitable repository of website data. Information stored in web server 410 may be accessed (e.g., retrieved, updated, and added to) via local network 412 and/or network 406 by one or more devices or systems of system 400. In some embodiments, web server 410 may host websites or applications that may be accessed by the user device 402. For example, web server 410 may host a financial service provider website that a user device may access by providing an attempted login that is authenticated by the trust score generation system 320. According to some embodiments, web server 410 may include software tools, similar to those described with respect to user device 402 above, that may allow web server 410 to obtain network identification data from user device 402. The web server may also be hosted by an online provider of website hosting, networking, cloud, or backup services, such as Microsoft Azure™ or Amazon Web Services™.

The local network 412 may include any type of computer networking arrangement used to exchange data in a localized area, such as WiFi, Bluetooth™, Ethernet, and other suitable network connections that enable components of the device recognition system 408 to interact with one another and to connect to the network 406 for interacting with components in the system 400 environment. In some embodiments, the local network 412 may include an interface for communicating with or linking to the network 406. In other embodiments, certain components of the device recognition system 408 may communicate via the network 406, without a separate local network 406.

The device recognition system 408 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 402 may be able to access device recognition system 408 using the cloud computing environment. User device 402 may be able to access device recognition system 408 using specialized software. The cloud computing environment may eliminate the need to install specialized software on user device 402.

In accordance with certain example implementations of the disclosed technology, the device recognition system 408 may include one or more computer systems configured to compile data from a plurality of sources, such as the trust score generation system 320, web server 410, and/or the database 416. The trust score generation system 320 may correlate compiled data, analyze the compiled data, arrange the compiled data, generate derived data based on the compiled data, and store the compiled and derived data in a database such as the database 416. According to some embodiments, the database 416 may be a database associated with an organization and/or a related entity that stores a variety of information relating to customers, transactions, ATM, and business operations. The database 416 may also serve as a back-up storage device and may contain data and information that is also stored on, for example, database 360, as discussed with reference to FIG. 3.

Embodiments consistent with the present disclosure may include datasets. Datasets may comprise actual data reflecting real-world conditions, events, and/or measurements. However, in some embodiments, disclosed systems and methods may fully or partially involve synthetic data (e.g., anonymized actual data or fake data). Datasets may involve numeric data, text data, and/or image data. For example, datasets may include transaction data, financial data, demographic data, public data, government data, environmental data, traffic data, network data, transcripts of video data, genomic data, proteomic data, and/or other data. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (e.g., structure), including a data type, key-value pair, label, metadata, field, relationship, view, index, package, procedure, function, trigger, sequence, synonym, link, directory, queue, or the like. Datasets of the embodiments may contain foreign keys, for example, data elements that appear in multiple datasets and may be used to cross-reference data and determine relationships between datasets. Foreign keys may be unique (e.g., a personal identifier) or shared (e.g., a postal code). Datasets of the embodiments may be "clustered," for example, a group of datasets may share common features, such as overlapping data, shared statistical properties, or the like. Clustered datasets may share hierarchical relationships (e.g., data lineage).

Example Use Case

The following example use case describes examples of a typical user flow pattern. This section is intended solely for explanatory purposes and not in limitation.

In one example, a user may purchase a new mobile phone. A system owned and/or operated by an organization may be in communication with the mobile device carrier associated with both the user's new mobile phone as well as a previous mobile phone of the user. The system may receive data from the mobile device carrier, the data including an indication that the user purchased the new mobile phone. Using his or her new mobile phone, the user may attempt to perform an action, such as logging into a mobile application on the new mobile phone. The system may receive or recognize the user's login attempt, and in response, may generate a trust score associated with the user and new mobile phone. The trust score may indicate a likelihood that the user is associated with the new mobile phone (e.g., as opposed to being an unauthorized user).

If the system determines the trust score does not exceed a predetermined threshold, for example, does not exceed a score of 60% out of 100%, the system may be configured to perform one or more fraud prevention actions. For example, the system may transmit a notification to a secondary device (e.g., a laptop computer) associated with the user. The notification may say, for example: "We see you may have a new device. Please click the below link if you wish to proceed setting up your new device."

Alternatively, if the system determines the trust score exceeds the predetermined threshold, the system may first cause the new mobile device to display a notification via a GUI. For example, the user may see a pop-up notification on a screen of the new mobile device, the notification saying: "We see you have a new device. Would you like to match your prior security settings by setting up a facial recognition system for sign in?" The user may then respond to the notification by clicking "yes" or "proceed" on the screen. Once the system receives this response from the user, the system may identify the facial recognition system settings that the user had been using on a previous mobile phone, and may enable these same settings on the new mobile phone.

The system may further cause the new mobile device to display a notification via the GUI, the notification saying: "Now that we are finished setting up your new device, let's handle your old device." The user may then respond to the notification by clicking on various settings (e.g., security, authentication, etc.) associated with the old device that the user wishes to change and/or deactivate. Once the system receives this response(s) from the user, the system may accordingly change and/or deactivate any specified settings associated with the old device.

In some examples, disclosed systems or methods may involve one or more of the following clauses:

Clause 1: A system comprising: one or more processors; and a memory in communication with the one or more processors and storing instructions that, when executed by the one or more processors, are configured to cause the system to: receive data from a mobile device carrier, the data indicative of a user being associated with a new device; receive, via the new device, a request to perform an action; generate, via a machine learning model (MLM), a trust score associated with the user and the new device, wherein the trust score is based on the data and a previous trust score associated with the user and a previous device; determine whether the trust score exceeds a predetermined threshold; responsive to determining the trust score does not exceed the predetermined threshold, conduct one or more fraud prevention actions with respect to the user and the new device; and responsive to determining the trust score exceeds the predetermined threshold: cause the new device to display a notification via a graphical user interface (GUI); receive, via the GUI of the new device, a response to the notification; and responsive to receiving the response: identify one or more user settings associated with the previous device; and enable the one or more user settings via the new device.

Clause 2: The system of clause 1, wherein the one or more fraud prevention actions comprise transmitting a second notification to a secondary device associated with the user, requesting the user conduct multi-factor authentication, or both.

Clause 3: The system of clause 1, wherein the one or more user settings comprise one or more of security settings, authentication settings, user preferences, or combinations thereof.

Clause 4: The system of clause 1, wherein the action comprises one or more of accessing an account, joining a computer network, participating in a joint user session, conducting a transaction, or combinations thereof.

Clause 5: The system of clause 1, wherein the one or more user settings are associated with a mobile application installed on the new device.

Clause 6: A system comprising: one or more processors; and a memory in communication with the one or more processors and storing instructions that, when executed by the one or more processors, are configured to cause the system to: receive data indicative of a user being associated with a new device; receive, via the new device, a request to perform an action; generate, via a machine learning model (MLM) and based on the data, a trust score associated with the user and the new device; determine whether the trust score exceeds a predetermined threshold; responsive to determining the trust score does not exceed the predetermined threshold, conduct one or more fraud prevention actions with respect to the user and the new device; and responsive to determining the trust score exceeds the predetermined threshold: identify one or more user settings associated with a previous device associated with the user; and enable the one or more user settings via the new device.

Clause 7: The system of clause 6, wherein the one or more fraud prevention actions comprise transmitting a second notification to a secondary device associated with the user, requesting the user conduct multi-factor authentication, or both.

Clause 8: The system of clause 6, wherein the one or more user settings comprise one or more of security settings, authentication settings, user preferences, or combinations thereof.

Clause 9: The system of clause 6, wherein the action comprises one or more of accessing an account, joining a computer network, participating in a joint user session, conducting a transaction, or combinations thereof.

Clause 10: The system of clause 6, wherein the data is received from a mobile device carrier associated with the previous and new devices.

Clause 11: The system of clause 6, wherein the one or more user settings are associated with a mobile application installed on the new device.

Clause 12: A system comprising: one or more processors; and a memory in communication with the one or more processors and storing instructions that, when executed by the one or more processors, are configured to cause the system to: receive data indicative of a user device being associated with new identification information; receive, from a user via the user device, a request to perform an action, the request comprising the new identification information; generate, via a machine learning model (MLM) and based on the data, a trust score associated with the user and the user device; determine whether the trust score exceeds a predetermined threshold; responsive to determining the trust score does not exceed the predetermined threshold, conduct one or more first actions with respect to the user and the user device; and responsive to determining the trust score exceeds the predetermined threshold, conduct one or more second actions with respect to the user and the user device.

Clause 13: The system of clause 12, wherein the new identification information comprises one or more of a phone number, an account number, a service carrier, or combinations thereof.

Clause 14: The system of clause 12, wherein the one or more first actions comprise transmitting a notification to a secondary device associated with the user, requesting the user conduct multi-factor authentication, or both.

Clause 15: The system of clause 12, wherein the one or more second actions comprise identifying one or more user settings previously associated with the user device, and enabling the one or more user settings via the user device.

Clause 16: The system of clause 15, wherein the one or more user settings comprise one or more of security settings, authentication settings, user preferences, or combinations thereof.

Clause 17: The system of clause 16, wherein the one or more user settings are associated with a mobile application installed on the user device.

Clause 18: The system of clause 12, wherein the instructions are further configured to cause the system to: responsive to determining the trust score exceeds the predetermined threshold: cause the user device to display a notification via a graphical user interface (GUI); and receive, via the GUI of the user device, a response to the notification, wherein conducting the one or more second actions is in response to receiving the response.

Clause 19: The system of clause 12, wherein the action comprises one or more of accessing an account, joining a computer network, participating in a joint user session, conducting a transaction, or combinations thereof.

Clause 20: The system of clause 12, wherein the data is received from a mobile device carrier associated with the user device.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms “component,” “module,” “system,” “server,” “processor,” “memory,” and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations." "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:

one or more processors; and a memory in communication with the one or more processors and storing instructions that, when executed by the one or more processors, are configured to cause the system to:

receive data from a mobile device carrier, the data indicative of a user being associated with a new device;

receive, from the user via the new device, a request to perform an action, wherein the action comprises logging into a mobile application by the user via the new device;

responsive to receiving the request to perform the action from the new device, generate, via a machine learning model (MLM), a trust score associated with the user and the new device, wherein the trust score is based on the data and a previous trust score associated with the user and a previous device and the trust score represents a likelihood that the user is an authorized user of the new device;

determine whether the trust score exceeds a predetermined threshold;

responsive to determining the trust score does not exceed the predetermined threshold, conduct one or more fraud prevention actions with respect to the user and the new device; and responsive to determining the trust score exceeds the predetermined threshold:

cause the new device to display a notification via a graphical user interface (GUI) comprising one or more editable fields that allow the user to make a selection of one or more user settings from a plurality of user settings to be transferred from the previous device to the new device;

receive, via the GUI of the new device, a response to the notification comprising a selection of user settings the user wants to have transferred from the previous device to the new device; and responsive to receiving the response:

identify one or more user settings associated with the previous device that correspond to the selection of user settings; and enable the one or more user settings via the new device.

2. The system of claim 1, wherein the one or more fraud prevention actions comprise transmitting a second notification to a secondary device associated with the user, requesting the user conduct multi-factor authentication, or both.

3. The system of claim 1, wherein the one or more user settings comprise one or more of security settings, authentication settings, user preferences, or combinations thereof.

4. The system of claim 1, wherein the action further comprises one or more of accessing an account, joining a computer network, participating in a joint user session, conducting a transaction, or combinations thereof.

5. The system of claim 1, wherein the one or more user settings are associated with the mobile application installed on the new device.

6. The system of claim 1, wherein the notification further comprises a request to the user to indicate modifications to the previous device and the response to the notification further provides an indication of one or more modifications to be performed on the previous device.

7. The system of claim 6, wherein the one or more modifications to be performed on the previous device comprises one or more of unenrolling from a particular application and deactivating one or more device-specific authentication methods.

8. The system of claim 1, wherein the one or more user settings comprise a facial recognition setting used on the previous device.

9. The system of claim 1, wherein the data from the mobile device carrier comprises one or more of a model number, serial number, phone number, device identification, mobile equipment identifier, and a date the user obtained the new device.

10. A system comprising:

one or more processors; and a memory in communication with the one or more processors and storing instructions that, when executed by the one or more processors, are configured to cause the system to:

receive data indicative of a user being associated with a new device;

receive, from a user via the new device, a request to perform an action, wherein the action comprises logging into a mobile application by the user via the new device;

responsive to receiving the request to perform the action from the new device, generate, via a machine learning model (MLM) and based on the data, a trust score associated with the user and the new device, wherein the trust score represents a likelihood that the user is an authorized user of the new device;

determine whether the trust score exceeds a predetermined threshold;

responsive to determining the trust score does not exceed the predetermined threshold, conduct one or more fraud prevention actions with respect to the user and the new device; and responsive to determining the trust score exceeds the predetermined threshold:

identify one or more user settings associated with a previous device associated with the user based on the previous device and the new device being connected to a same network; and enable the one or more user settings via the new device.

11. The system of claim 10, wherein the one or more fraud prevention actions comprise transmitting a second notification to a secondary device associated with the user, requesting the user conduct multi-factor authentication, or both.

12. The system of claim 10, wherein the one or more user settings comprise one or more of security settings, authentication settings, user preferences, or combinations thereof.

13. The system of claim 10, wherein the action further comprises one or more of accessing an account, joining a computer network, participating in a joint user session, conducting a transaction, or combinations thereof.

14. A system comprising:

one or more processors; and a memory in communication with the one or more processors and storing instructions that, when executed by the one or more processors, are configured to cause the system to:

receive data indicative of a user device being associated with new identification information;

receive, from a user via the user device, a request to perform an action, the request comprising the new identification information and the action comprising an attempt to log into a mobile application by the user via the user device;

responsive to receiving the request to perform the action from the user device, generate, via a machine learning model (MLM) and based on the data, a trust score associated with the user and the user device, wherein the trust score represents a likelihood that the user is an authorized user of the user device;

determine whether the trust score exceeds a predetermined threshold;

responsive to determining the trust score does not exceed the predetermined threshold, conduct one or more first actions with respect to the user and the user device; and responsive to determining the trust score exceeds the predetermined threshold, conduct one or more second actions with respect to the user and the user device comprising:

identifying one or more user settings associated with a previous user device associated with the user based on the system having operational control over the one or more user settings on the previous user device; and enabling the one or more user settings via the user device.

15. The system of claim 14, wherein the new identification information comprises one or more of a phone number, an account number, a service carrier, or combinations thereof.

16. The system of claim 14, wherein:

the one or more first actions comprise transmitting a notification to a secondary device associated with the user, requesting the user conduct multi-factor authentication, or both.

17. The system of claim 16, wherein the one or more user settings comprise one or more of security settings, authentication settings, user preferences, or combinations thereof.

18. The system of claim 14, wherein the instructions are further configured to cause the system to:

responsive to determining the trust score exceeds the predetermined threshold:

cause the user device to display a notification via a graphical user interface (GUI); and receive, via the GUI of the user device, a response to the notification, wherein conducting the one or more second actions is in response to receiving the response.

19. The system of claim 14, wherein the action further comprises one or more of accessing an account, joining a computer network, participating in a joint user session, conducting a transaction, or combinations thereof.

20. The system of claim 14, wherein the instructions are further configured to cause the system to:

cause the user device to display a notification via a graphical user interface requesting the user to indicate whether to change or deactivate an old user device;

receive, from the user device, a user input representing an indication from the user to change or deactivate the old user device; and change or deactivate the old user device in response to receiving the indication from the user.

* * * * *